Nov. 10, 1964

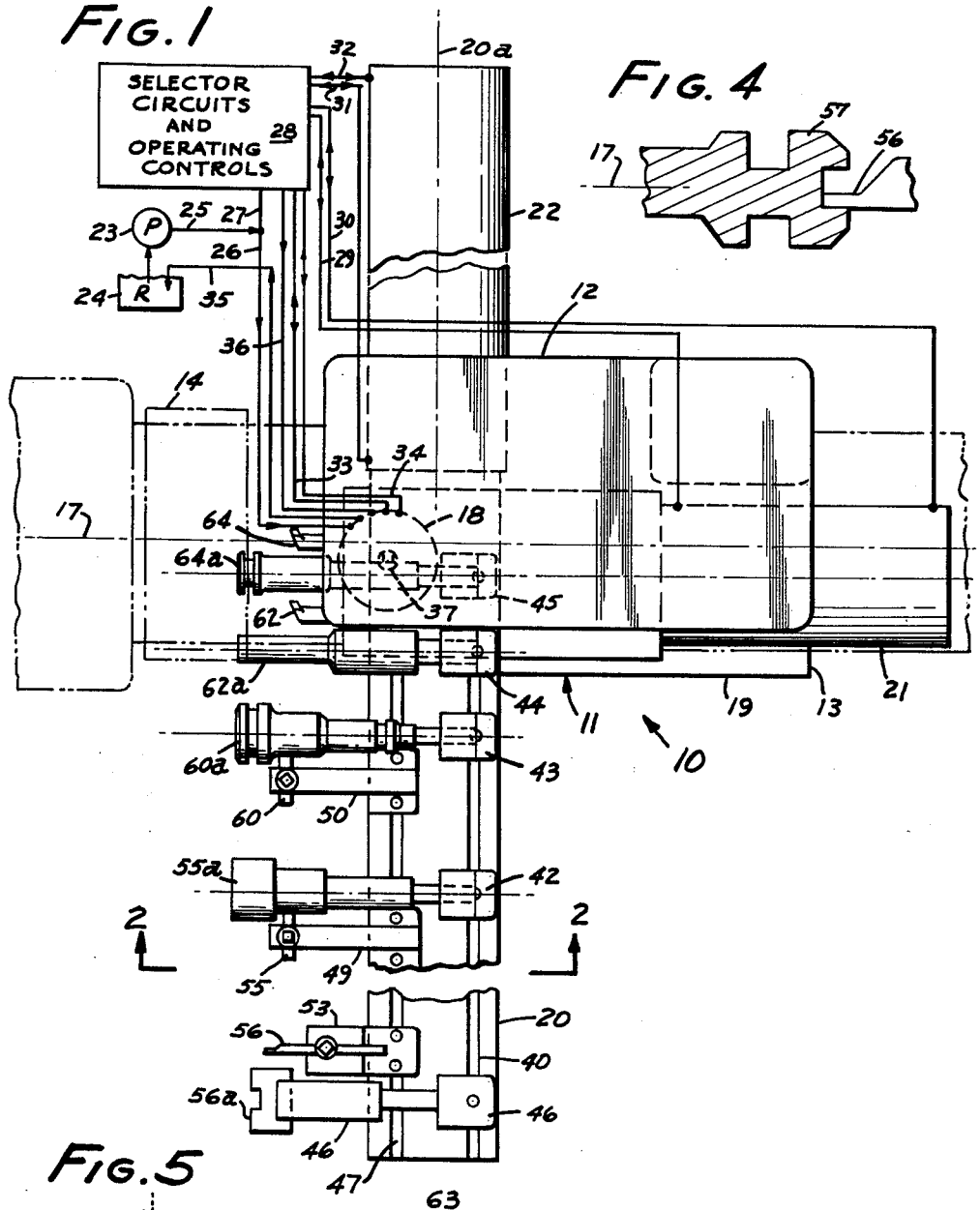

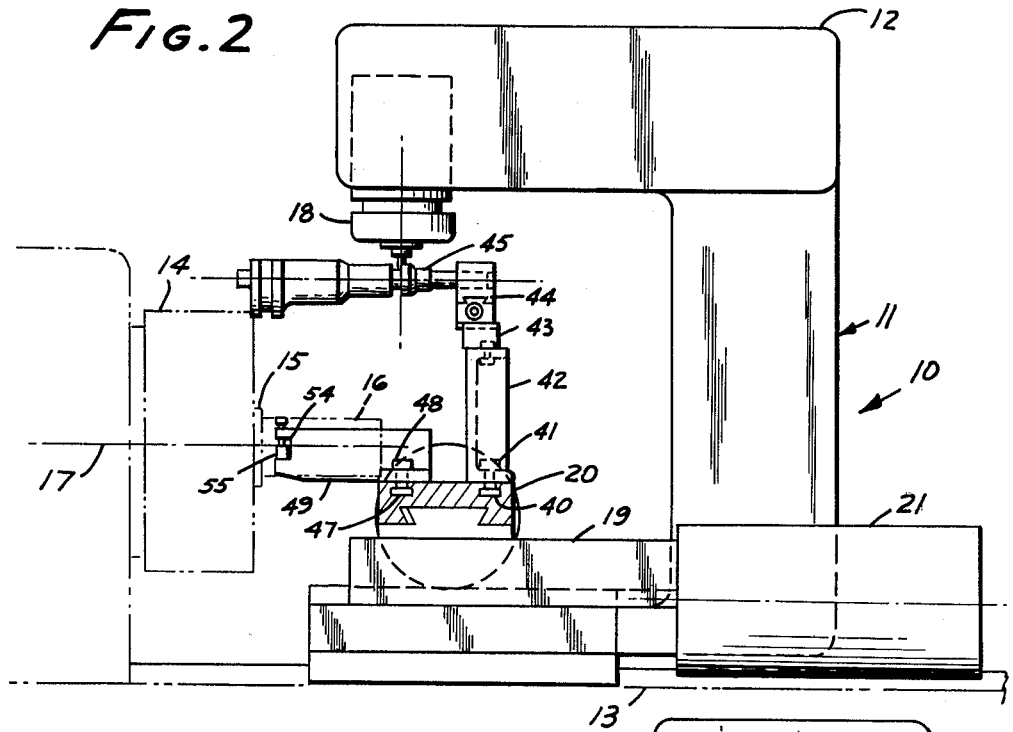
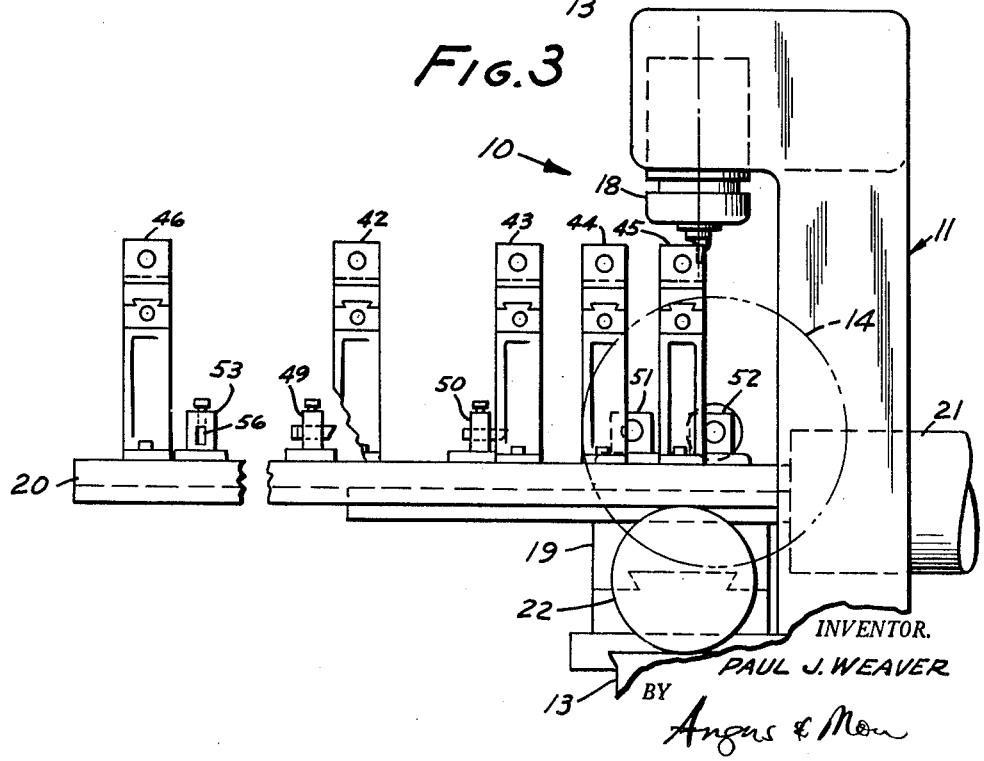

P. J. WEAVER 3,156,144

MULTIPLE TEMPLATE, MULTIPLE CUTTING
TOOL, CONTOUR COPYING MACHINE

Filed Aug. 1, 1961

INVENTOR.
PAUL J. WEAVER

BY
Angus & Mon
ATTORNEYS.

United States Patent Office 3,156,144
Patented Nov. 10, 1964

3,156,144
MULTIPLE TEMPLATE, MULTIPLE CUTTING
TOOL, CONTOUR COPYING MACHINE
Paul J. Weaver, Pasadena, Calif., assignor to True-Trace
Corporation, El Monte, Calif., a corporation of
Connecticut
Filed Aug. 1, 1961, Ser. No. 128,440
8 Claims. (Cl. 82—14)

This invention relates to a pattern-controlled machine tool and to a means for machining a plurality of contours with a plurality of tools in a single workpiece, without rehandling or intermediate adjustment of the workpiece, the templates, or the cutting tools.

In tracer controlled machinery, particularly in lathe tracers, it is conventional to chuck up a workpiece, and then to set a template in a template rail, adjust the tool with respect to the template, and then move the template and tool relative to a tracer valve and the workpiece so as to duplicate the contour of the template in the workpiece. For many parts, it is necessary to make a first rough cutting pass over the workpiece, and then to follow up with a finish cut. Because the contours of the rough and finish cut are very different, numerous techniques have been devised for attempting to machine the two of them without removing and replacing template, workpiece or cutting tool. Generally speaking, these techniques have been undesirable because, in substituting templates in a template rail, careful adjustments are required in order to place it in close axial, lateral and angular alignment. Because rough cutting and finish cutting tools are different, the use of appropriate tools required replacement and adjustment of them, too. Alternatively, the finish tool could be used for both passes, but this is often very undesirable.

To eliminate the template replacement problem, occasionally templates for the rough cuts have been placed to overlay a final cutting template. Then a larger contour has been cut, but not to particularly close dimensions. Furthermore, it is still necessary to change the cutting tool from a roughing tool to a finish tool, with its attendant problems.

Accordingly, particularly on production runs, it is now conventional practice to rough-cut a plurality of workpieces, taking each workpiece in and out of the chuck, and then to recycle these through the machine setup with a different template and different cutting tool. It is evident that in all of the above described art, extensive handling and adjustment of the machine's components, such as the tool, the templates, or the workpiece, or all three, are required and, accordingly, the use of the machine is somewhat inefficient.

It is an object of this invention to provide means for rough and finish cutting of workpieces which will not require rehandling of the workpiece, or indiivdual adjustments of the cutting tools and templates in forming successive contours on a single workpiece.

A machine tool according to this invention includes a means mounted to a frame for holding and rotating a workpiece, together with a tracer valve mounted to the frame. The machine tool further includes a pair of slides, one of which is movable in a feed direction, and one of which is movable in a contouring direction. The first of the slides is slidably mounted to the frame, and the second of the slides is mounted to the first of them, the said directions being non-parallel to each other, and usually perpendicular.

The second of the slides carries a plurality of template holders, each adapted to hold a template, and also a plurality of tool holders, each adapted to hold a cutting tool. The template holders and the tool holders are supplied in pairs so that each pair is adapted to hold a template having an edge to be duplicated in a workpiece and a cutting tool adapted to reproduce in the workpiece the contour of its respective template.

The machine is provided with means for powering the slides in the feed and contouring movements, the contouring movement being under control of the tracer valve. It is also provided with means for shifting the templates relative to the tracer valve so that different templates and different tools may be brought into adjacency with the tracer valve and the workpiece, respectively. The said powering means may be used for this latter shifting movement in some machines.

According to an optional feature of the invention the plurality of template holders and tool holders are provided spaced apart on the second slide, substantially in the direction of slide movement so that upon moving the slide through a sufficient distance, different templates may be brought into adjacency with the tracer valve.

According to still another optional feature of the invention, the template holders and tool holders are mounted to a rotary table, such as a turret which is itself mounted to the second slide, so that the turret can be rotated to bring the different templates and cutting tools into adjacency.

The above and other features of this invention will be fully understood from the following detailed description and the accompanying drawings in which:

FIG. 1 is a plan view partly in cutaway cross-section and partly in schematic notation, showing the presently preferred embodiment of the invention;

FIG. 2 is a cross-section taken at line 2—2 of FIG. 1;

FIG. 3 is a right hand view of FIG. 2;

FIG. 4 is a cross-section showing a facing operation carried out by the device of FIG. 1;

FIG. 5 illustrates some other contours machineable by the machine of FIG. 1;

Figure 6:
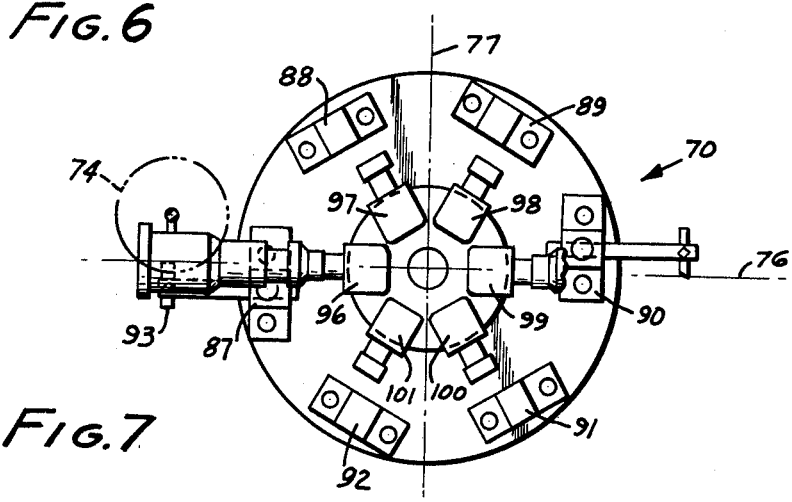
FIG. 6 is a top view of a fragment of another embodiment of the invention.

A machine tool 10 according to the invention is shown in FIGS. 1 and 2, having a frame 11, which includes an arbor 12 and a base 13. There is a headstock 14 with a chuck 15, which functions as a work holder to hold and rotate a workpiece 16 around axis 17. The lathe as shown does not include a headstock, although a headstock can be used with this invention, and also the headstock may form one of the slides yet to be described, if desired.

A tracer valve 18 is mounted to arbor 12. This tracer valve, and associated selector circuits and operating controls for the machine tool are disclosed in Weaver Patent No. 2,984,073. In the said patent, a tracer valve exerts contouring control on one axis of a two-axis machine tool, the other axis being a feed movement whose rate of movement is regulated by the tracer valve. The control in the said patent is applied to a die sinker in which the movements to be controlled are a vertical and a cross feed so that the macihne operates in a vertical plane. In the instant invention, the movements are in a horizontal plane, but the change of orientation of the cutting plane is immaterial and makes no difference in the configuration of the control circuits. The term "longitudinal" is readily substituted for the term "vertical" in said patent. A detailed description of the tracer valve and the selector circuits and operating controls will not be given here inasmuch as their details form no part of this invention. The elements of the patented circuit may readily be attached to the lathe disclosed herein instead of to a die sinker.

The lathe includes a first slide 19 and a second slide 20. These slides are disposed non-parallel to each other and in this illustration are arranged normally with respect to each other. The first slide is adapted to move parallel to axis 17 (longitudinally), and the second slide moves normally to the first slide along axis 20a (sometimes called lateral or cross movement). A first motor 21 and a second motor 22 are provided as motive means for the first and second slide, respectively. These motors may be either rotary hydraulic motors or piston-cylinder types. As can best be seen in FIG. 2, the first slide is mounted to the frame by a dovetail, and the second slide is mounted to the first slide by a dovetail. The first slide may, if desired, be the headstock of a lathe, although it is more conventional to use the carriage of the lathe for the first slide.

The first and second slides may be provided with manual positioning adjustments, if desired, such as screws, or they may be placed entirely under control of motors 21 and 22. Either way, the first and second slides can be initially positioned relative to the workpiece, and thereafter controlled by the tracer valve.

Control of feed movement by the tracer valve is not an essential feature of this invention. Machines are known in which the movements are independent of each other, and the device according to the invention can be utilized either way.

In FIG. 1, the means for supplying fluid under pressure for actuation of the motors are shown as including a pump 23 which withdraws hydraulic fluid from a reservoir 24 and discharges it into a pressure line 25. One branch 26 of the pressure line goes to a pressure port in the tracer valve where, in accordance with the setting of the tracer valve, it is distributed to one side or the other of a motor through selector circuits and operating controls 28 (hereinafter called "controls"). Branch 27 of the pressure line also goes to controls 28. Controls 28 have as their purpose the selection of which of the motors is to operate its slide as a feed movement and which is to operate it as a contouring movement under control of the tracer valve. A further purpose of these circuits and controls is to supply fluid directly to the motor which is to power a slide in the feed control.

Conduits 29, 30, 31, 32 are connected from controls 28 to opposite sides of respective motors. Tracer fluid conduits 33, 34 are connected between the tractor valve and controls 28 for direction of this fluid from the tracer valve to whichever of the motors is operating to control contouring movement.

Exhaust line 35 conducts exhaust fluid from the system out of the tracer valve back to reservoir. Coordinator line 36 conducts fluid exhausted from the motor under feed movement control through a coordinator portion of the tracer valve for the purpose of coordinating the feed rate with the contouring movements.

The above controls and their purposes are fully disclosed in said Patent 2,984,073, and will readily be understood by persons skilled in the art. It requires no further discussion here. Suffice it to say that the tracer valve includes a stylus 37 whose contact with templates or patterns is utilized as means for setting the valving of the tracer valve which causes the stylus to trace over the contour of the template or pattern and cause a cutting tool to duplicate that path relative to a workpiece, thereby to duplicate the contour of the template or pattern in the workpiece.

A feature of this invention resides in providing a plurality of template or pattern holders, and a plurality of respective cutting tools on the second slide. In FIG. 1, there is shown a T-slot 40 in the upper surface of the second slide to which are bolted by bolts 41, template holders 42–46.

Template holder 42, which is identical to the other template holders, is provided with perpendicularly oriented dovetail slides 43, 44, each of which is provided with screw means whereby a template held by the holder can be moved for adjustment longitudinally and laterally of the axis. A socket or other holding means is provided for grasping the template or pattern.

The term "template" is used herein as inclusive of any shaped article having an edge or surface whose contour is to be duplicated. This comprehends both flat plates having a contoured edge, and also full replicas of the body to be developed, such as those shown in FIG. 2.

A second T-slot 47 is formed in the top of the second slide and serves as anchor means for bolts 48 which retain tool holders 49–53 to the top of the slide. The tool holders have means, such as means 54 on tool holder 49, for holding a cutting tool 55. It will be noted that the tools which can be held by the tool holders are of different types. The tools in holders 49–52, inclusive, for instance, are side-cutting tools for cutting exterior and interior side surfaces, and vary in nature from rough cutting to finish cutting to O-ring groove cutting tools. Tool 56 in holder 53, on the other hand, is intended for a face cutting operation of the type shown in FIG. 4, wherein a workpiece 57 is shown being machined by this tool in facing movement, duplicating the end surface of template 56a.

FIG. 5 illustrates some external and internal configurations which can be cut by the tools of FIG. 1, both by external cutting and by internal boring. For example, line 58 illustrates a first roughing operation which is readily carried out by tool 55, duplicating template 55a in holder 42. The heavier line 59 is the final contour to be cut and is readily formed by finishing tool 60, duplicating template 60a in holder 43. Line 61 illustrates an initial roughing internal turning operation readily accomplished by tool 62, duplicating template 62a. Heavier line 63 illustrates a final configuration which is readily cut by finishing tool 64, duplicating template 64a.

It will be understood from what has been said that the templates and tools are set up on the second slide relative to each other in pairs, so that they can successively, in pairs, be brought into adjacency with the tracer valve and workpiece. Then a complete part can be formed in successive passes without removing and replacing the workpiece, the template or the cutting tool from the machine. It is only necessary to shift the second slide so that the next template and cutting tool are brought into adjacency.

Figure 7:
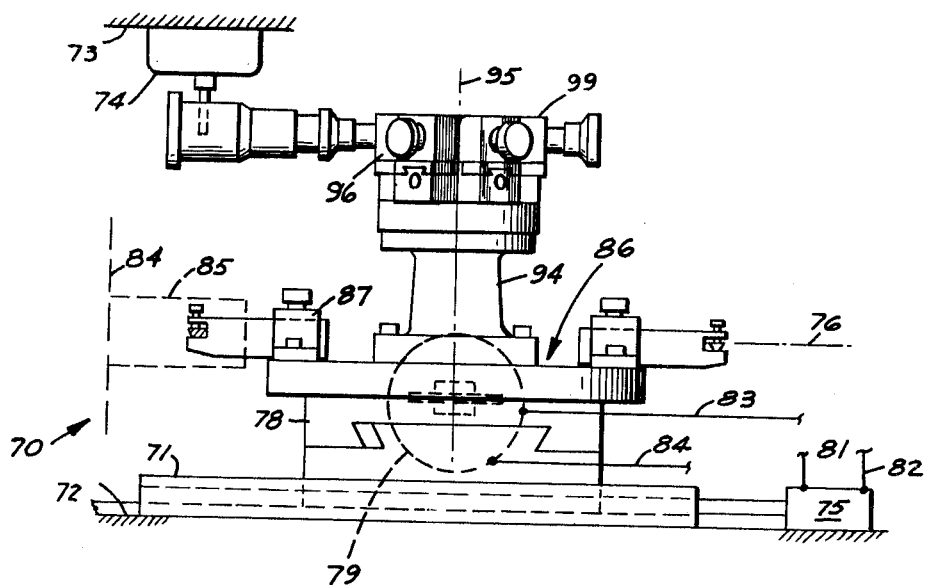
FIG. 7 is a side view of the embodiment of FIG. 6.

In FIGS. 6 and 7, there is shown another embodiment of the invention. In this embodiment, a machine tool 70 has its first slide 71 mounted to a frame 72, which includes an overhanging arbor 73 that supports a tracer valve 74. First motor 75 slides the first slide along axis 76, which axis is sometimes called the "longitudinal axis." Axis 77 is normal to axis 76. Axis 76 is sometimes called the "cross axis."

A second slide 78 is mounted to the first slide, slidable along the cross axis. A motor 79 is provided for sliding it in cross movement. Motors 75 and 79 have conduits 81–84 adapted to be connected to selector circuits and operating controls, power supply and tracer valve as in FIG. 1.

The frame also includes a headstock-chuck 84 to hold and rotate a workpiece 85 which is to be machined.

This device differs from that of FIG. 1 in that a plurality of template holders and cutting tools is mounted on a turret instead of being spaced along a slide. This is best shown in FIG. 7 where a turret 86 is shown mounted to the second slide, and the devices on the turret are thereby mounted to the second slide. The turret may be considered as a part of said slide. Conventional turret indexing and rotating means (not shown) may be utilized. Tool holders 87–92 are mounted near the periphery of this table at a first elevation, and are adapted to hold cutting tools, such as tool 93. These tool holders preferably enable a tool to be adjusted in all lateral and angular directions. The same wide variety of tool sizes and types can be utilized in this device, as in the device of FIG. 1.

A stanchion 94 is mounted centrally on the axis of rotation 95 of the turret, and supports six template holders 96–101. These template holders are identical to those in FIG. 1, each of them having a pair of orthogonally related dovetail ways so that the template can be adjusted laterally and longitudinally to aid in setup.

The template holders and tool holders are provided in pairs as in the device of FIG. 1.

The operation of both of the devices should be evident from the foregoing. Utilizing the selector circuits and operating controls, it is first determined which of the motors is to be operated under contouring movement control, that is, to move toward and away from the workpiece in order to form the contour, and which of the motors is to be operated in the feed direction, that is, to move the tool along the surface being formed. Tools 55, 60, 62 and 64 are adapted for contouring movement toward and away from the axis of rotation so that the second slide will be under control of the tracer valve for contouring movement along the cross axis, while the first slide moves the cutting tool and template in a feed movement along the longitudinal axis when they are used. With tool 56, contouring movement is along the longitudinal axis, and feed movement along the cross axis. With this latter tool, the first slide will be under control of the tracer valve.

The selector circuits or manual adjustment controls of the tool such as lead and cross screws, if provided, or even the tracer valve itself, may be used to move the tracer valve and pattern toward each other for bringing them initially into adjacency. After contact is made between them, feeding and contouring control is automatic. When the first pass is finished on one of the patterns, the tracer valve is withdrawn from the pattern and the control, or the tracer valve, is again manipulated to traverse the slide under feed control so that the next pattern comes into adjacency with the tracer valve at the "start" end of the contour, and the next and successive passes are then carried out. It will be seen that once the machine setup is accomplished, an indefinite number of parts can be completely machined utilizing a plurality of patterns without further adjustment or handling of anything other than moving new patterns and cutting tools into adjacency with the tracer valve and workpiece, and removing completed workpieces and substituting new stock to be machined.

The use of FIG. 6 is identical to that just described, it being only necessary to rotate the turret appropriately to bring the successive cutting tools and templates into adjacency with the workpiece and the template.

In order to switch from turning to facing operations, it is only necessary to reverse the selection of which motor is under contouring control, and use a facing tool and template.

It will thereby be seen that this device provides an attachment for a contour copying machine, which greatly simplifies the mass production of parts which must be machined by a plurality of passes forming a plurality of contours.

This invention is not to be limited by the embodiments shown in the drawings and described in the description which are given by way of example and not of limitation, but only in accordance with the scope of the eppended claims.

I claim:

1. In a pattern-controlled machine tool of the class having a pair of non-parallel slides, one atop the other, a tracer valve, at least one of which slides is controllable by the tracer valve, the improvement comprising a plurality of template holders on the uppermost slide, each adapted to hold a respective template whose contour is to be duplicated in a workpiece, and a plurality of tool holders on said uppermost slide, one for each of said template holders, each adapted to hold tools to machine a workpiece, the templates and tools thereby being provided in sets, the members of each set being rigidly interconnected relative to each other through the uppermost slide, means for moving the templates into individual adjacency with the tracer valve and thereby to move its respective tool into adjacency with the workpiece, whereupon relative movement between the tracer valve and template is duplicated between the workpiece and tool and whereby successive sets of respective templates and tools may be moved into adjacency for successive machining operations without removal of the workpiece from the machine tool.

2. In combination: a frame; means for holding a workpiece to said frame; a first and a second slide, the first slide being slidedly mounted to the frame and the second slide being slidedly mounted to the first slide, the slides being non-parallel, one being adapted to move in a feed movement and the other in a contouring movement; a first and a second motive means for the first and second slides, respectively; a tracer valve mounted to the frame; a plurality of spaced-apart template holders on the second slide, each being adapted to hold an individual template with a contour to be traced lying generally parallel to the direction of feed movement; a plurality of spaced-apart tool holders, each being adapted to hold an individual tool with its cutting edge in fixed spatial relationship to a respective template, the templates and tools thereby being provided in sets, the members of each set being rigidly interconnected relative to each other through the uppermost slide; means for interconnecting the tracer valve and the motive means for moving the respective slide in a contouring movement; whereby upon operating the other of said motive means in a feed movement, the tracer valve in cooperation with one of the templates shifts its respective tool relative to the workpiece in contouring movement to duplicate the contour of the template in the holder, and whereby different sets of respective templates and tools may be brought into adjacency with the tracer valve and workpiece to machine different contours on the workpiece without removal of the workpiece.

3. A combination according to claim 2 in which the template holders are spaced from each other along the second slide, with the spacing between them lying along the direction of axial movement of the second slide.

4. A combination according to claim 3 in which each template holder is provided with adjustment means providing for adjustably moving the template in both of said directions.

5. A combination according to claim 4 in which each tool holder is provided with means for enabling it to be adjustably located along the direction of axial movement of the second slide.

6. A combination according to claim 2 in which the second slide includes a turret to which the template holders and tool holders are mounted, said holders being so disposed and arranged as to be individually alignable with the workpiece by rotation of the turret.

7. A combination according to claim 6 in which each template holder is provided with adjustment means providing for adjustably moving the template in both of said directions.

8. A combination according to claim 7 in which each tool holder is provided with means for enabling it to be adjustably located along the direction of axial movement of the second slide.

References Cited in the file of this patent

UNITED STATES PATENTS

| | | |
|---|---|---|
| 1,521,340 | Teller | Dec. 30, 1924 |
| 1,689,711 | Ashton | Oct. 30, 1928 |
| 1,846,986 | Bogart | Feb. 23, 1932 |
| 2,239,413 | Dewey | Apr. 27, 1941 |
| 2,314,250 | Smith et al. | Mar. 16, 1943 |
| 2,383,266 | LeTourneau | Aug. 21, 1945 |
| 2,422,964 | Hibbard | June 24, 1947 |
| 2,798,395 | Johnson | July 9, 1957 |

FOREIGN PATENTS

| | | |
|---|---|---|
| 851,468 | Great Britain | Oct. 19, 1960 |

UNITED STATES PATENT OFFICE
CERTIFICATE OF CORRECTION

Patent No. 3,156,144                                November 10, 1964

Paul J. Weaver

It is hereby certified that error appears in the above numbered patent requiring correction and that the said Letters Patent should read as corrected below.

Column 4, line 48, for "76", second occurrence, read -- 77 --.

Signed and sealed this 21st day of September 1965.

(SEAL)
Attest:

ERNEST W. SWIDER                                        EDWARD J. BRENNER
Attesting Officer                                             Commissioner of Patents